United States Patent
Manor et al.

(10) Patent No.: US 6,479,963 B1
(45) Date of Patent: Nov. 12, 2002

(54) RECHARGEABLE BATTERY PACKS

(75) Inventors: Dror Manor, Herzliya; Guy Weinstein, Neve Ephraim, both of (IL)

(73) Assignee: Techtium Ltd. (IL)

( * ) Notice: Subject to any disclaimer, the term of this patent is extended or adjusted under 35 U.S.C. 154(b) by 0 days.

(21) Appl. No.: 09/980,928

(22) PCT Filed: May 2, 2000

(86) PCT No.: PCT/IL00/00250
§ 371 (c)(1),
(2), (4) Date: Nov. 1, 2001

(87) PCT Pub. No.: WO00/69013
PCT Pub. Date: Nov. 16, 2000

(30) Foreign Application Priority Data

May 5, 1999 (IL) .................................................. 129797

(51) Int. Cl.⁷ ............................................. H01M 10/46
(52) U.S. Cl. ...................................... 320/110; 320/112
(58) Field of Search ................................ 320/100, 106, 320/107, 110, 112, 114; 729/49, 100

(56) References Cited

U.S. PATENT DOCUMENTS

| | | | |
|---|---|---|---|
| 4,140,957 A | 2/1979 | Rapp | |
| 5,304,917 A | 4/1994 | Somerville | |
| 5,568,536 A | 10/1996 | Tiller et al. | 379/58 |
| 5,646,508 A | 7/1997 | Van Phuoc et al. | |
| 5,652,502 A | 7/1997 | Van Phuoc et al. | |
| 5,717,308 A | 2/1998 | Yoshihiro et al. | |
| 5,793,187 A | 8/1998 | Bradley | |
| 6,025,695 A | 2/2000 | Friel et al. | 320/106 |

FOREIGN PATENT DOCUMENTS

| | | |
|---|---|---|
| EP | 0 657 982 | 6/1995 |
| GB | 2 352 887 | 2/2001 |
| JP | 8 149184 | 6/1996 |
| WO | WO 01/22696 | 3/2001 |

OTHER PUBLICATIONS

Brochure: Techtium©, "Cick–IN: The New World of Mobile Phone Batteries", Patech Tikva, Israel, 1999, pp. 1–4 no month.

*Primary Examiner*—Edward H. Tso
(74) *Attorney, Agent, or Firm*—Ostrolenk, Faber, Gerb & Soffen, LLP

(57) ABSTRACT

This invention discloses an improved rechargeable battery pack (30) particularly suitable for use with cellular telephones (32) or other portable devices, wherein the battery pack (30) includes at least one rechargeable cell (40), at least one primary cell (52), and a rechargeable cell recharger (34), including a voltage converter (50), receiving an output from the at least one primary cell (52) at a first voltage and converting it to a second voltage suitable for recharging the at least one rechargeable cell (40).

6 Claims, 5 Drawing Sheets

RECHARGEABLE BATTERY PACKS

FIELD OF THE INVENTION

The present invention relates to rechargeable battery packs generally and more particularly to battery packs for use with cellular telephones and other portable devices.

BACKGROUND OF THE INVENTION

Modern, small size, high-performance cellular telephones are currently powered by nickel-metal or lithium-ion cells which are characterized by efficient power storage and output both at low and high output power.

Alkaline batteries are well known for many applications but are not preferred for powering cellular telephones, because of their relatively low efficiency at peak power outputs used during telephone transmission.

SUMMARY OF THE INVENTION

The present invention seeks to provide an improved rechargeable battery pack particularly suitable for use with cellular telephones as well as a cellular telephone including an improved battery pack.

There is thus provided in accordance with a preferred embodiment of the present invention an improved rechargeable battery pack particularly suitable for use with cellular telephones or other portable devices as well as a cellular telephone including an improved battery pack wherein the battery pack includes:

- at least one rechargeable cell providing relatively efficient stored energy output at both relatively high and relatively low output current levels;
- at least one primary cell providing efficient stored energy output at relatively low output current levels and relatively inefficient stored energy output at relatively high output current levels; and
- a rechargeable cell recharger, receiving an output from the at least one primary cell at said relatively low output current level.

Preferably, a user operable switch is provided to selectably supply power from the at least one primary cell to the rechargeable cell recharger.

There is also provided in accordance with a preferred embodiment of the present invention an improved rechargeable battery pack particularly suitable for use with cellular telephones as well as a cellular telephone including an improved battery pack wherein the battery pack includes:

- at least one rechargeable cell providing relatively efficient stored energy output at both relatively high and relatively low output current levels;
- a receptacle for receiving at least one primary cell providing efficient stored energy output at relatively low output current levels and relatively inefficient stored energy output at relatively high output current levels; and
- a rechargeable cell recharger, responsive to an output from the at least one primary cell at said relatively low output current level for recharging the at least one rechargeable cell.

It is a particular feature of the present invention that a primary cell can thus be efficiently used to power an application having high current level power requirements but using the primary cell to charge a rechargeable cell at a relatively low current level. This feature is even more significant in view of the fact that most primary cells store energy more efficiently that most rechargeable cells.

In accordance with a preferred embodiment of the present invention the rechargeable cell recharger also comprises line voltage recharging circuitry which receives power at a line voltage and which is operative to recharge a rechargeable cell with or without recharging the primary cell.

Additionally in accordance with a preferred embodiment of the present invention the battery pack also includes circuitry for limiting the amount of recharging of the rechargeable cell from the at least one primary cell according to the amount that the rechargeable cell is charged.

The rechargeable cell is preferably a lithium-ion or nickel-metal cell, while the primary cell is preferably an alkaline battery such as a conventional AA or AAA cell.

BRIEF DESCRIPTION OF THE DRAWINGS

The present invention will be understood and appreciated from the following detailed description, taken in conjunction with the drawing in which.

DETAILED DESCRIPTION OF A PREFERRED EMBODIMENT

Figure 1:
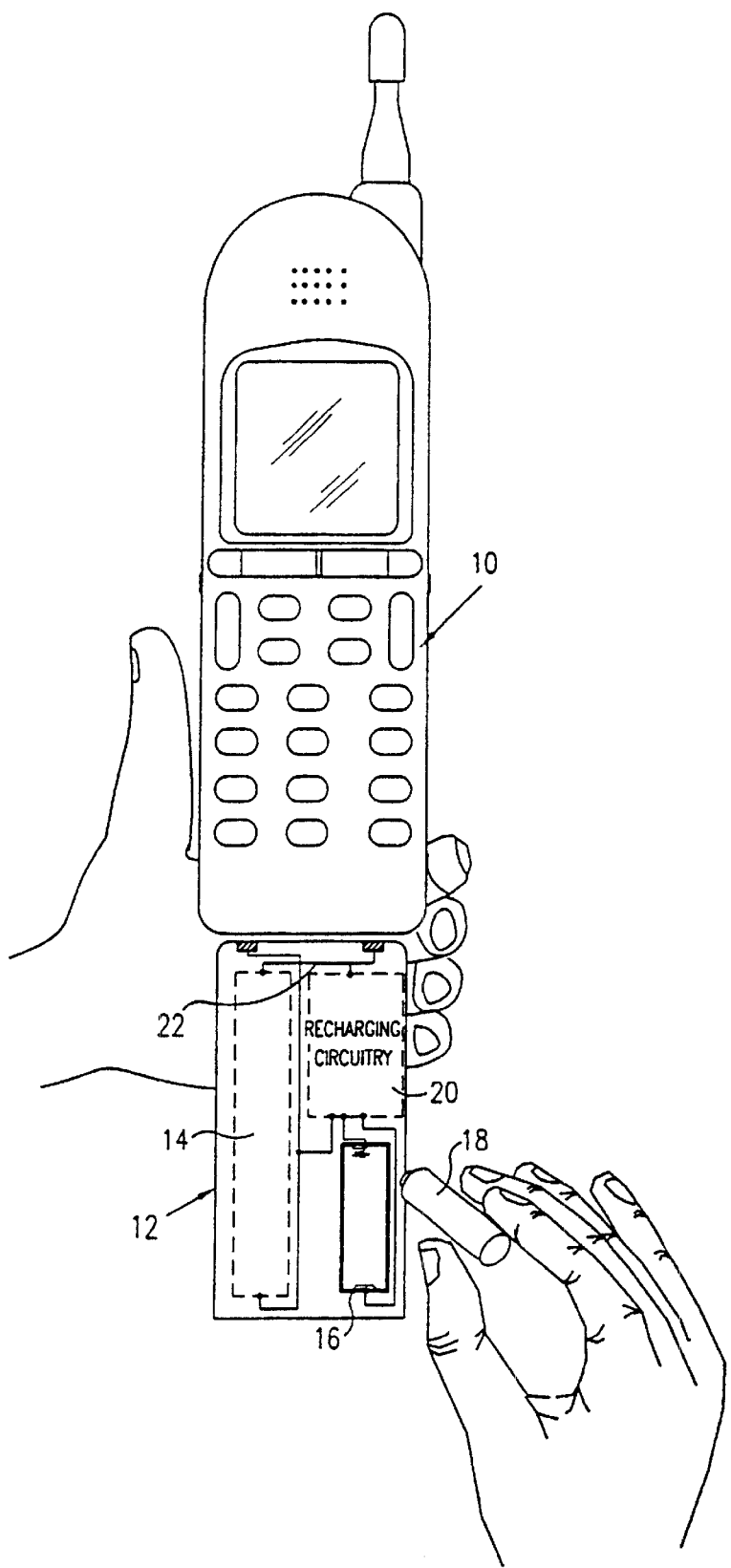
FIG. 1 is a pictorial illustration of a cellular telephone constructed and operative in accordance with a preferred embodiment of the present invention.

Reference is now made to FIG. 1, which illustrates a cellular telephone 10 having removably associated therewith a battery pack 12 constructed and operative in accordance with a preferred embodiment of the present invention. The cellular telephone 10 may be any suitable cellular telephone, such as a Motorola Star-Tac, an Ericsson 700 or a Nokia 6000.

Battery pack 12 typically includes a conventional rechargeable cell 14, such as a lithium-ion or nickel-metal battery 14 and a socket 16 for removably receiving a primary cell 18, such as a conventional alkaline battery, such as an AAA-side battery providing an output voltage of 1.5 volts. The lithium-ion battery is coupled via conventional recharging circuitry 20, which typically includes standard battery protection circuitry, to a power bus 22. Power bus 22 is coupled to the internal circuitry of the telephone 10 when the battery pack 12 is fully attached to the telephone 10.

Socket 16 is electrically connected to rechargeable cell 14 via circuitry 20, which also includes circuitry for converting the output voltage of the primary cell 18, seated in socket 16, typically 1.5 volts, to a desired recharging voltage of the rechargeable cell, typically 3.8 volts. Circuitry 20 also preferably includes circuits which limit recharging of rechargeable cell 14 from primary cell 18 to a predetermined recharging termination threshold applied to the rechargeable cell. Once the rechargeable cell is recharged to the predetermined recharging termination threshold, recharging from primary cell 18 is terminated.

In the embodiment of FIG. 1, when the rechargeable cell 14 requires recharging in that it falls below a predetermined recharging initiation threshold, which is lower than the recharging termination threshold, a user may simply insert a primary cell 18, such as a conventional alkaline battery, into socket 16. Recharging commences and continues until the predetermined recharging termination threshold is reached. The primary cell 18 may then be removed or retained in the socket.

Figure 2:
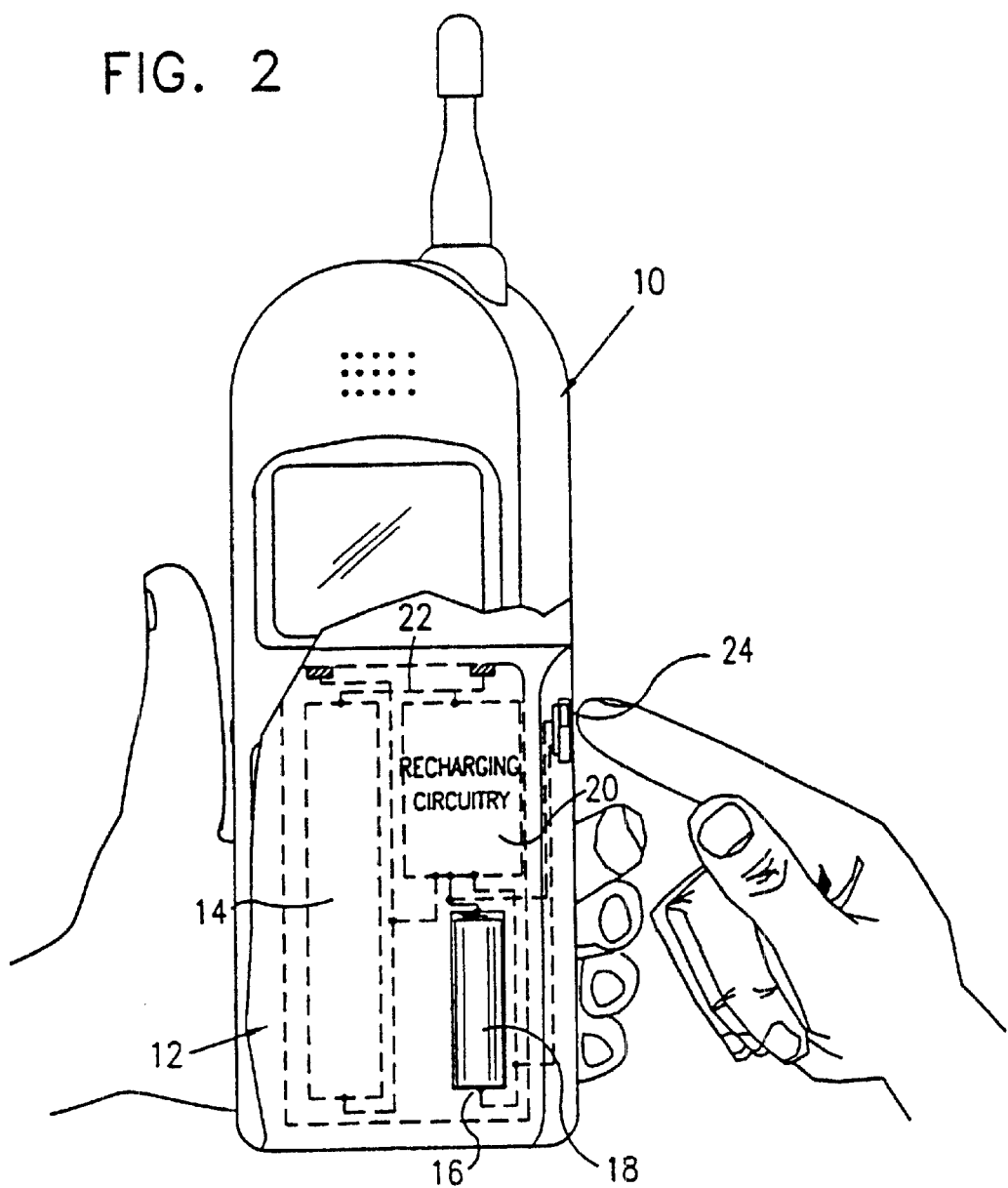
FIG. 2 is a pictorial illustration of a cellular telephone constructed and operative in accordance with another preferred embodiment of the present invention.

Reference is now made to FIG. 2, which illustrates a variation of the embodiment of FIG. 1, which may be identical to the embodiment of FIG. 1 other than in the fact that a primary cell 18 is normally retained in socket 16 even when recharging of the rechargeable cell 14 is not required.

In the embodiment of FIG. 2, a switch 24, which is normally accessible from the outside of the telephone is provided for governing supply of voltage from the primary cell 18 via socket 16 to circuitry 20. In this embodiment, when recharging of the rechargeable cell 14 is required, the user need not remove the battery back and insert a primary cell, but need only operate switch 24 to connect the primary cell 18 in circuit with circuitry 20, for recharging of the rechargeable cell 14, in the manner described hereinabove.

All other relevant aspects of the structure and operation of the embodiment of FIG. 2 may be identical to those of the embodiment of FIG. 1.

Figure 3:
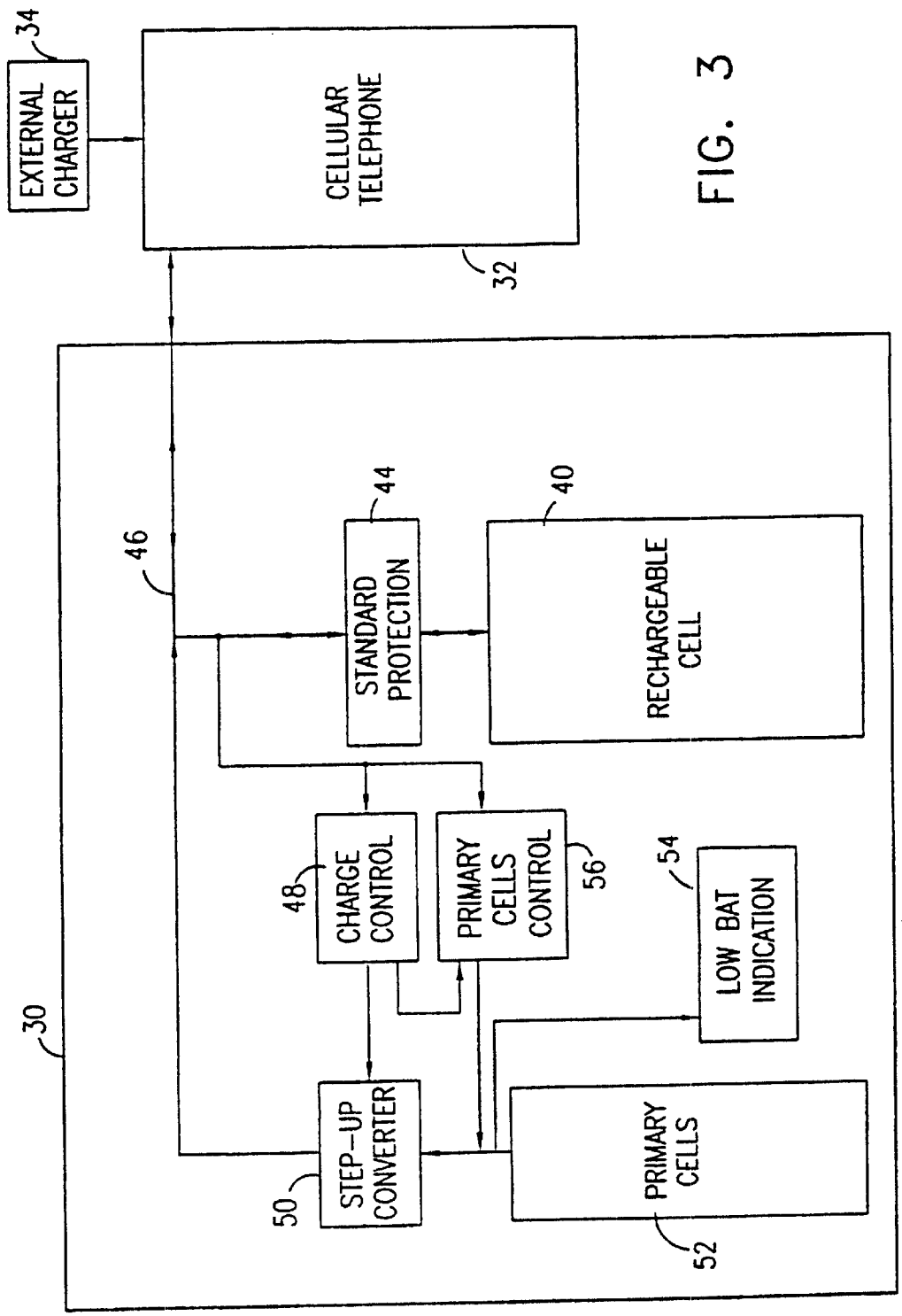
FIG. 3 is a block diagram illustration of a battery pack associated with a cellular telephone in accordance with a preferred embodiment of the present invention.

Reference is now made to FIG. 3, which is a block diagram illustration of a typical battery pack 30 associated with a cellular telephone 32 in accordance with a preferred embodiment of the present invention. Cellular telephone 32 may be rechargeable in a conventional manner using a conventional external charger 34 which operates on line current. It is appreciated that battery pack 12 of FIGS. 1 and 2 may be constructed as hereinbelow described with reference to FIG. 3 in accordance with a preferred embodiment of the present invention.

As seen in FIG. 3, one or more rechargeable cells 40 are connected via standard battery protection circuitry 44 to a power bus 46, which is connected to a corresponding power bus (not shown) of the cellular telephone 32 for powering the cellular telephone and enabling recharging of rechargeable cells 40 in a conventional manner via the cellular telephone 32.

Also connected to power bus 46 is rechargeable cell charge control circuitry 48 whose output governs the operation of a step-up DC-DC converter 50 which receives the output of one or more primary cells 52, such as alkaline batteries and raises the voltage thereof. The output of converter 50 is supplied via power bus 46 and circuitry 44 to rechargeable cells 40 for recharging thereof. A low battery indicator 54 is preferably provided to indicate the charged state of the primary cells 52.

Rechargeable cell charge control circuitry 48 also provides a control output to primary cell charge control circuitry 56 which is operative to prevent recharging of the primary cells when the primary cells are recharging the rechargeable cells.

Figure 4A:
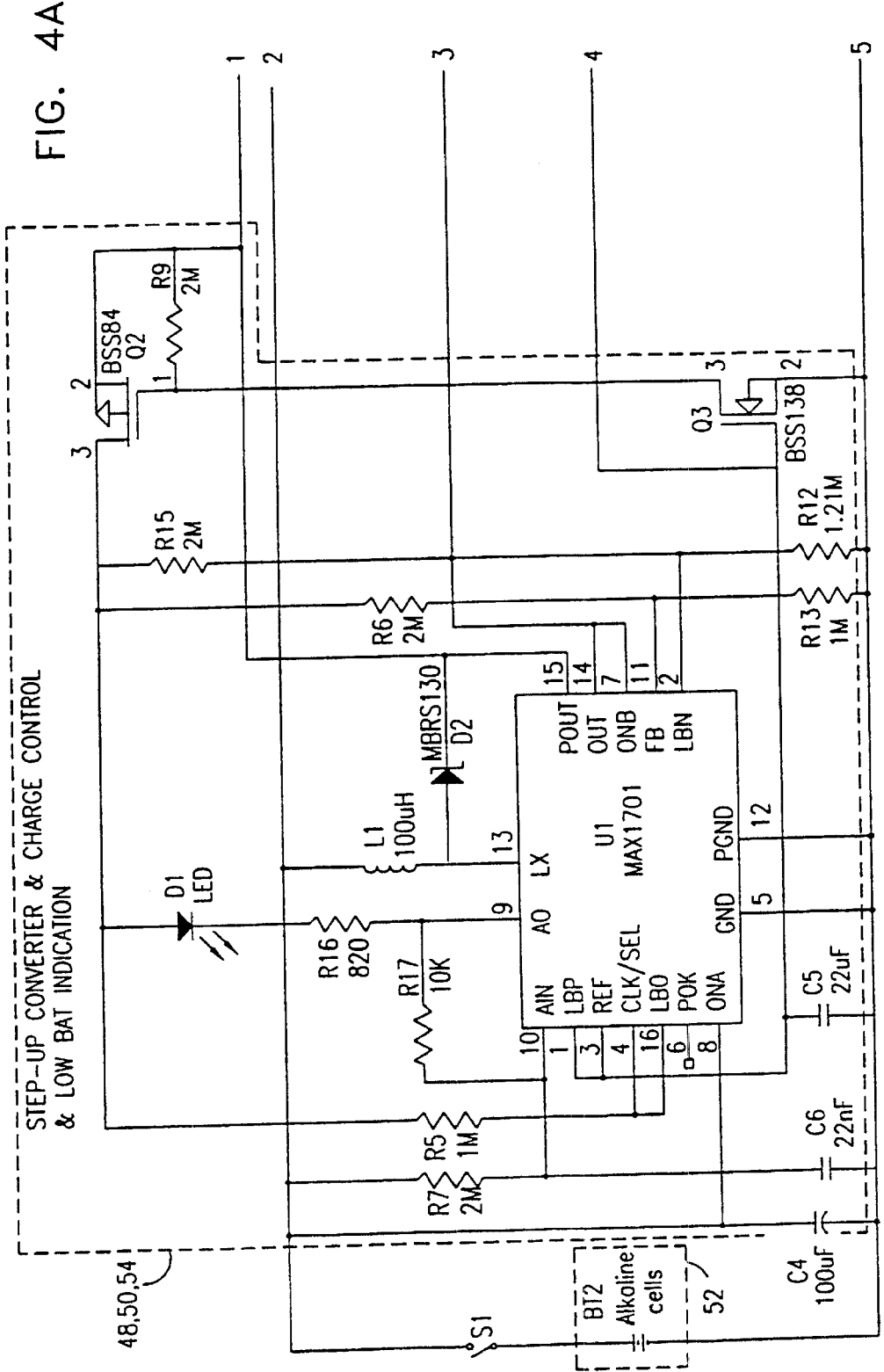
FIGS. 4A and 4B taken together are a schematic illustration of the part of the circuitry of the apparatus of FIG. 1.
Figure 4B:
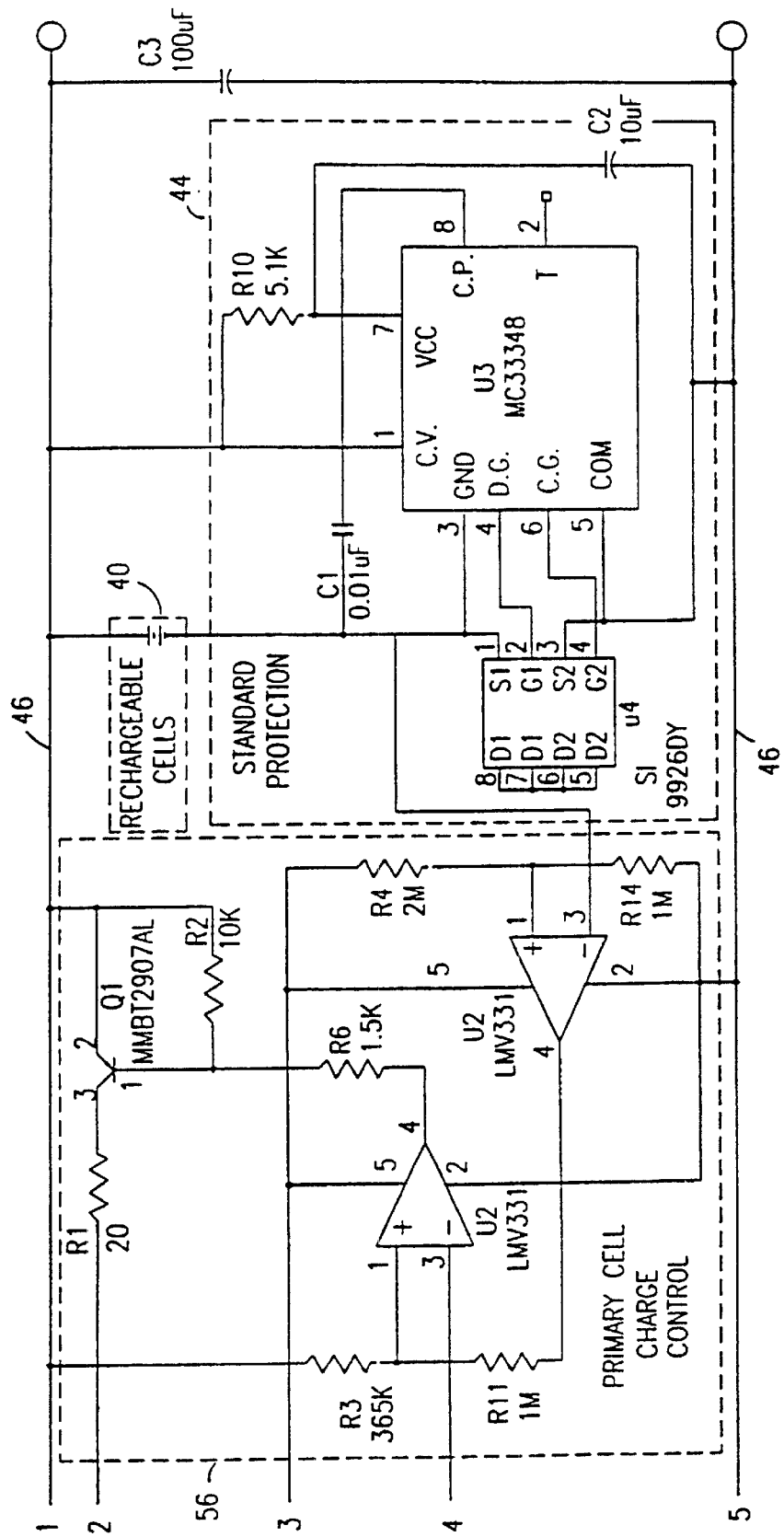

Reference is now made to FIGS. 4A and 4B which are self-explanatory schematic illustrations of part of the circuitry of FIG. 3. Each block in FIG. 3 is indicated in outline on the circuitry of FIGS. 4A and 4B and designated by its corresponding reference numeral in FIG. 3. It is appreciated that the embodiment of FIGS. 4A and 4B, particularly the standard protection circuitry 44 are designed for use with lithium-ion rechargeable cells.

It will be appreciated by persons skilled in the art that the present invention is not limited by what has been particularly shown and described hereinabove. Rather it is appreciated that the present invention encompasses both combinations and subcombinations of the various features described hereinabove as well and variations and modifications thereof which would occur to a person skilled in the art upon reading the foregoing description and which are not in the prior art.

What is claimed is:

1. An improved rechargeable battery pack particularly suitable for use with cellular telephones or other portable devices, the battery pack including:

at least one rechargeable cell;

at least one primary cell; and a rechargeable cell recharger, including a voltage converter, receiving an output from the at least one primary cell at a first voltage and converting it to a second voltage suitable for recharging the at least one rechargeable cell.

2. A cellular telephone comprising:

at least one voice transducer;

a wireless transmitter and a wireless receiver coupled to said at least one voice transducer, and a battery pack including:

at least one rechargeable cell;

at least one primary cell; and a rechargeable cell recharger, including a voltage converter, receiving an output from the at least one primary cell at a first voltage and converting it to a second voltage suitable for recharging the at least one rechargeable cell.

3. Apparatus according to claim 1 and wherein said rechargeable cell recharger also comprises line voltage rechargeable cell recharging circuitry which receives power at a line voltage and which is operative to recharge the at least one rechargeable cell without recharging the at least one primary cell.

4. Apparatus according to claim 1 and wherein the battery pack also includes circuitry for limiting the amount of recharging of the at least one rechargeable cell from the at least one primary cell in accordance with the amount that the rechargeable cell is charged.

5. Apparatus according to claim 2 and wherein said rechargeable cell recharger also comprises line voltage rechargeable cell recharging circuitry which receives power at a line voltage and which is operative to recharge the at least one rechargeable cell without recharging the at least one primary cell.

6. Apparatus according to claim 2 and wherein the battery pack also includes circuitry for limiting the amount of recharging of the at least one rechargeable cell from the at least one primary cell in accordance with the amount that the rechargeable cell is charged.

* * * * *